3,050,461
REACTION PRODUCT OF N,N-DIALKENYLMELAMINE AND A SALICYLALDEHYDE AND ITS USE
John P. Luvisi, Park Ridge, Ill., assignor to Universal Oil Products Company, Des Plaines, Ill., a corporation of Delaware
No Drawing. Filed May 23, 1960, Ser. No. 30,760
13 Claims. (Cl. 208—251)

This invention relates to a novel composition of matter and to the manufacture and use thereof.

The novel composition of matter of the present invention is selected from those illustrated by the following general structures:

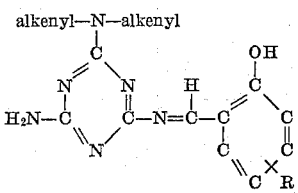

and

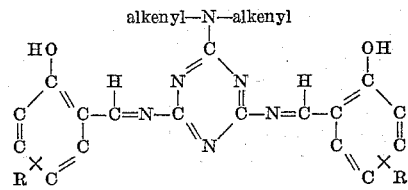

where R is selected from the group consisting of hydrogen and a hydrocarbon radical.

The novel composition of matter is prepared by the reaction of N,N-dialkenylmelamine with a salicylaldehyde. A particularly preferred N,N-dialkenylmelamine for use in the present invention is N,N-diallylmelamine. The preparation of the novel composition of the present invention is illustrated by the reaction of N,N-diallylmelamine and salicylaldehyde, with the understanding that these reactions are typical and that other N,N-dialkenylmelamines and substituted salicylaldehydes may be used.

The first equation illustrates the reaction of one molar proportion of N,N-diallylmelamine with one molar proportion of salicylaldehyde.

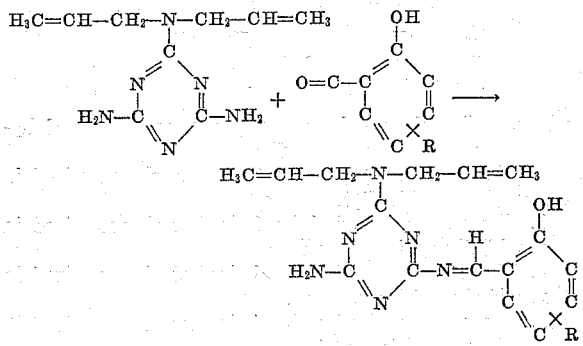

The second equation illustrates the reaction of one molar proportion of N,N-diallylmelamine with two molar proportions of salicylaldehyde.

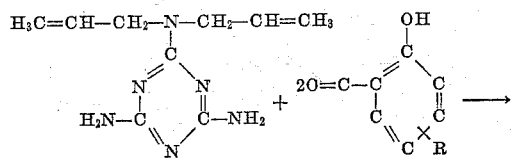

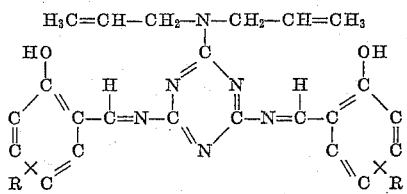

The symbol R in both of the above equations designates hydrogen or a hydrocarbon group and preferably an alkyl group containing from one to 20 carbon atoms and more particularly from one to 10 carbon atoms.

Any suitable N,N-dialkenylmelamine may be used in preparing the novel composition of matter. As hereinbefore set forth, N,N-diallylmelamine is particularly preferred. Other N,N-dialkenylmelamines include N,N-divinylmelamine, N,N-dipropenylmelamine, N,N-dimethallylmelamine, N,N-dicrotylmelamine, N,N-dipentenylmelamine, N,N-dihexenylmelamine, N,N-diheptenylmelamine, N,N-dioctenylmelamine, N,N-dinonenylmelamine, N,N-didecenylmelamine, etc.

Any suitable salicylaldehyde may be used in preparing the novel composition of matter. Salicylaldehyde is particularly preferred. Alkyl substituted salicylaldehydes include methyl salicylaldehyde, ethyl salicylaldehyde, propyl salicylaldehyde, butyl salicylaldehyde, amyl salicylaldehyde, hexyl salicylaldehyde, heptyl salicylaldehyde, octyl salicylaldehyde, nonyl salicylaldehyde and decyl salicylaldehyde. Additional alkyl substituted salicylaldehydes include undecyl salicylaldehyde, dodecyl salicylaldehyde, tridecyl salicylaldehyde, tetradecyl salicylaldehyde, pentadecyl salicylaldehyde, hexadecyl salicylaldehyde, heptadecyl salicylaldehyde, octadecyl salicylaldehyde, nonadecyl salicylaldehyde, eicosyl salicylaldehyde, etc. The alkyl substituent generally will be in a position para to the aldehyde group. In another embodiment the salicylaldehyde may contain two or more alkyl substituents. In still another embodiment the substituent on the salicylaldehyde ring is selected from aralkyl, aryl, alkaryl and cycloalkyl groups. In still another embodiment the aliphatic substituent may contain unsaturation in the chain.

As hereinbefore set forth, the reaction is effected using one or two molar proportions of salicylaldehydes per molar proportion of N,N-dialkenylmelamine. The condensation is effected in any suitable manner and is readily effected by refluxing the required concentrations of N,N-dialkenylmelamine and the salicylaldehyde. The reaction generally is effected in the presence of an organic solvent. Any suitable solvent may be employed including, for example, benzene, toluene, xylene, cumene, decalin, etc. The refluxing temperature will depend upon the particular solvent employed and generally will be within the range of from about 200° to about 400° F. In a preferred embodiment the condensation is effected in a zone provided with a water outlet so that the water formed during the reaction is continuously removed from the reaction zone. The solvent is removed in either the same or different zone.

From the equations hereinbefore set forth, it will be noted that one or two molar proportions of salicylaldehyde react with one molar proportion of N,N-dialkenylmelamine. However, in most cases the composition will contain a mixture of the products illustrated by the two structures hereinbefore set forth. While the individual compounds may be separated, if desired, it is generally preferred to use the mixed products as such.

The novel composition of matter of the present invention is recovered as a solid and is used to remove metal components from organic liquids. In many instances organic liquids contain metal components which are detrimental in the subsequent transportation, use or storage of the organic liquids. For example, one method of refining gasoline is the copper sweetening process, in which process the gasoline is contacted with a copper-containing reagent. As a result of this treatment the sweetened gasoline usually contains small amounts of copper compounds. In addition, gasoline comes in contact with various metals in the course of refining, storage and shipping operations and this, in turn, may result in the gasoline containing small amounts of such metals as copper, cobalt, iron, chromium, lead, etc. These metal components appear to catalyze oxidative reactions which results in the formation of oxidized reaction products in the gasoline.

The novel composition of matter of the present invention is a solid material and is used as a fixed bed in a reaction zone through which the organic liquid containing the metal component is passed. This treatment generally is effected at ambient temperature, although elevated temperatures may be employed and usually will not exceed about 300° F. Any suitable pressure may be employed and may range from atmospheric to 2000 pounds per square inch or more. In another embodiment this treatment may be effected by forming a suspension or slurry of the solid composition in the organic liquid and passing the same through a suitable reaction zone, after which the catalyst is separated from the liquid by filtering or otherwise.

The following examples are introduced to illustrate further the novelty and utility of the present invention but not with the intention of unduly limiting the same.

*Example I*

This example illustrates the reaction of one mole of N,N-diallylmelamine with two moles of salicylaldehyde. A mixture of 20 grams (0.1 mole) of N,N-diallylmelamine and 24 grams (0.2 mole) of salicylaldehyde in 100 grams of xylene was refluxed in a Dean Stock trap which permits the continuous removal of the water formed in the reaction. The refluxing was continued for 1.5 hours, at which time the theoretical amount of water (3.6 grams) was removed. The residue comprised an orange solid and a small amount of liquid. After removal of the xylene solvent, there remained 40.5 grams of pale orange powder having a melting point of 680° F. This corresponds approximately to the theoretical yield of the product illustrated by the second equation hereinbefore set forth.

*Example II*

As hereinbefore set forth, the composition of the present invention is effective in removing metal components from organic liquids. Gasoline containing 0.701 mg./l. of copper and 0.38 part per million of cobalt was shaken for three hours at room temperature with two grams of the solid composition prepared as described in Example I. The gasoline was separated from the catalyst by filtering and the treated gasoline contained 0.473 mg./l. of copper and 0.18 part per million of cobalt.

It will be noted that the composition of matter served to reduce the copper and cobalt contents of the gasoline.

*Example III*

This example illustrates the preparation of a product corresponding to the first equation hereinbefore set forth; namely, the condensation of equal molar proportions of N,N-diallylmelamine and salicylaldehyde. 100 grams (0.5 mole) of N,N-diallylmelamine and 60 grams (0.5 mole) of salicylaldehyde in 400 grams of xylene are refluxed in a Dean Stock trap for a period of two hours. Water formed during the reaction is continously removed. After removal of the xylene, the product is recovered as an orange solid. This solid is used as a fixed bed in a reaction zone through which gasoline containing metallic components is passed at 100° F. This serves to reduce the metallic content of the gasoline.

*Example IV*

This example relates to the condensation of equal molar proportions of N,N-dipropenylmelamine with 4-methyl-salicylaldehyde. As used in the present specification and claims, N,N-dipropenylmelamine contains the double bond in the propenyl group in a position beta to the nitrogen atom instead of in the position gamma thereto as in the allyl substituent illustrated in the equations hereinbefore set forth.

Equal molar proportions of 4-methyl salicylaldeyhde and of N,N-dipropenylmelamine in cumene solvent are refluxed until the theoretical amount of water is recovered. After removal of the cumene solvent, there is recovered an orange solid which comprises the condensation product of equal molar proportions of salicylaldehyde and of N,N-dipropenylmelamine.

*Example V*

Two molar proportions of salicylaldehyde are condensed with one molar proportion of N,N-dimethallylmelamine by refluxing the mixture in xylene solvent until the theoretical amount of water is removed. The xylene solvent is removed and the product is recovered as a solid comprising the condensation product of two molar proportions of salicylaldehyde and one molar proportion of N,N-dimethallylmelamine.

*Example VI*

This example illustrates the cndensation of two molar proportions of N,N-dicrotylmelamine with one molar proportion of salicylaldehyde. This condensation is effected by refluxing the required concentrations of the reactants until the theoretical amount of water is removed. The solvent then is removed and the product is recovered as the condensation product of two molar proportions of salicylaldehyde and one molar proportion of N,N-dicrotyl-melamine.

I claim as my invention:

1. A compound selected from the group consisting of compounds having the following structures:

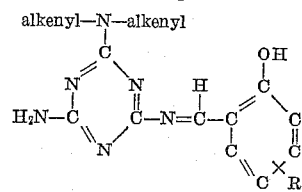

and

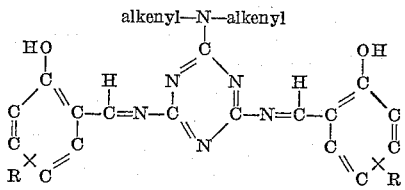

where R is selected from the group consisting of hydrogen and a hydrocarbon radical.

2. The compound of claim 1 further characterized in that said alkenyl is allyl.
3. The compound of claim 1 further characterized in that said alkenyl is propenyl.
4. The compound of claim 1 further characterized in that said alkenyl is methallyl.
5. The compound of claim 1 further characterized in that said alkenyl is crotyl.
6. A compound having the general structure:

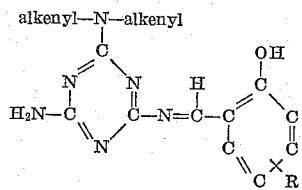

where R is selected from the group consisting of hydrogen and an alkyl radical.

7. The compound of claim 6 wherein said alkenyl is allyl.

8. A compound having the following general structure:

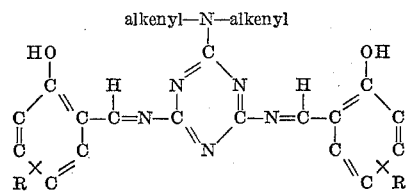

where R is selected from the group consisting of hydrogen and an alkyl group.

9. The compound of claim 8 wherein said alkenyl is allyl.

10. The method of removing a metal component from an organic liquid containing the same which comprises contacting said organic liquid with a compound as defined in claim 1.

11. The method of removing a metal component from an organic liquid containing the same which comprises contacting said organic liquid with a compound as defined in claim 6.

12. The method of removing a metal component from an organic liquid containing the same which comprises contacting said organic liquid with a compound as defined in claim 8.

13. The method of claim 10 further characterized in that said organic liquid comprises gasoline.

References Cited in the file of this patent

UNITED STATES PATENTS 2,829,119    Dudley et al. _____ Apr. 1, 1958